United States Patent [19]
Murakami

[11] Patent Number: 5,838,887
[45] Date of Patent: Nov. 17, 1998

[54] PRINTER HAVING A BACKED-UP MEMORY FOR STORING OPTIONAL EMULATION PROGRAM

[75] Inventor: Masahiro Murakami, Hekinan, Japan

[73] Assignee: Brother Kogyo Kabushiki Kaisha, Nagoya, Japan

[21] Appl. No.: 77,505

[22] Filed: Jun. 17, 1993

Related U.S. Application Data

[63] Continuation of Ser. No. 794,047, Nov. 19, 1991, abandoned.

[30]     Foreign Application Priority Data

Nov. 21, 1990   [JP]   Japan ..................................... 2-317502

[51] Int. Cl.⁶ .................................................... G06K 15/00
[52] U.S. Cl. ........................................... 395/112; 395/114
[58] Field of Search ..................................... 395/100, 112,
        395/114–116, 113, 500, 653, 834, 882,
      890, 892; 358/442, 261.4, 467, 444; 400/70,
                                                            76

[56]        References Cited

U.S. PATENT DOCUMENTS

| | | | |
|---|---|---|---|
| 5,025,348 | 6/1991 | Nelson | 395/112 |
| 5,043,918 | 8/1991 | Murahashi | 395/115 |
| 5,075,874 | 12/1991 | Steeves et al. | 395/112 |

FOREIGN PATENT DOCUMENTS 2 220 286   1/1990   United Kingdom ................... 395/112

*Primary Examiner*—Arthur G. Evans
*Attorney, Agent, or Firm*—Oliff & Berridge. PLC

[57]            ABSTRACT

A printer has a backed-up memory unit for storing an optional emulation program. A CPU performs an installation of the optional emulation program contained in an emulation cartridge which is inserted in an expansion slot. The optional emulation program thus installed can be used to interpret control codes and print data relayed to the printer from a host computer.

10 Claims, 3 Drawing Sheets

PRINTER HAVING A BACKED-UP MEMORY FOR STORING OPTIONAL EMULATION PROGRAM

This is a Continuation of application Ser. No. 07/794,047 filed Nov. 19, 1991, now abandoned.

BACKGROUND OF THE INVENTION

1. Field of the Invention

The present invention relates to a printer such as a laser beam printer, and more particularly to an emulation program for various printers.

2. Description of the Related Art

Printers receive control codes and print data from a host computer and control a printing unit according to the received control codes. Printing is carried out based on the print data. In such printers, control codes are grouped into a plurality of groups, each being specific to a particular printing unit.

There is known that a so-called emulation program exists for reading the control codes that are established for a certain printer and converting the control codes into differently grouped control codes established for another printer. Such an emulation program is stored in a ROM (Read-Only Memory) incorporated in a printer, or exists in an emulation cartridge. The emulation cartridge has a ROM in the interior thereof for storing the emulation program, and is inserted into an expansion slot in the printer for use.

For the emulation program stored in the ROM provided in the interior of the printer, replacement of the ROM is required when the emulation program is to be updated or a new emulation program is to be added. For the emulation program stored in the emulation cartridge, since the emulation program in the emulation cartridge needs to be executed each time the control code is inputted, the emulation cartridge cannot be detached and therefore occupies the expansion slot during operation.

SUMMARY OF THE INVENTION

The present invention has been made in order to solve the above problems. Accordingly, it is an object of the present invention to provide a printer which has a backed-up memory unit for storing an emulation program that is inputted, so that the emulation program can easily be modified or updated.

It is another object of the present invention to prevent an expansion slot or the like from being occupied.

To achieve the above and other objects, there is provided a printer in which a control code and print data are relayed from a host computer and a printing unit is controlled according to the received control code to carry out printing based on the print data. The printer is provided with an input means for inputting an optional emulation program used for interpreting the control code. The printer is further provided with a storage means for storing the emulation program that has been inputted to the input means. The storage means is backed up so as not to erase the stored emulation program when the printer is powered off. The printer is further provided with a control means for controlling both the input means and the storage means so that the emulation program inputted to the input means is installed in the storage means.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Preferred embodiments of the present invention will hereinafter be described with reference to the accompanying drawings.

Figure 1:
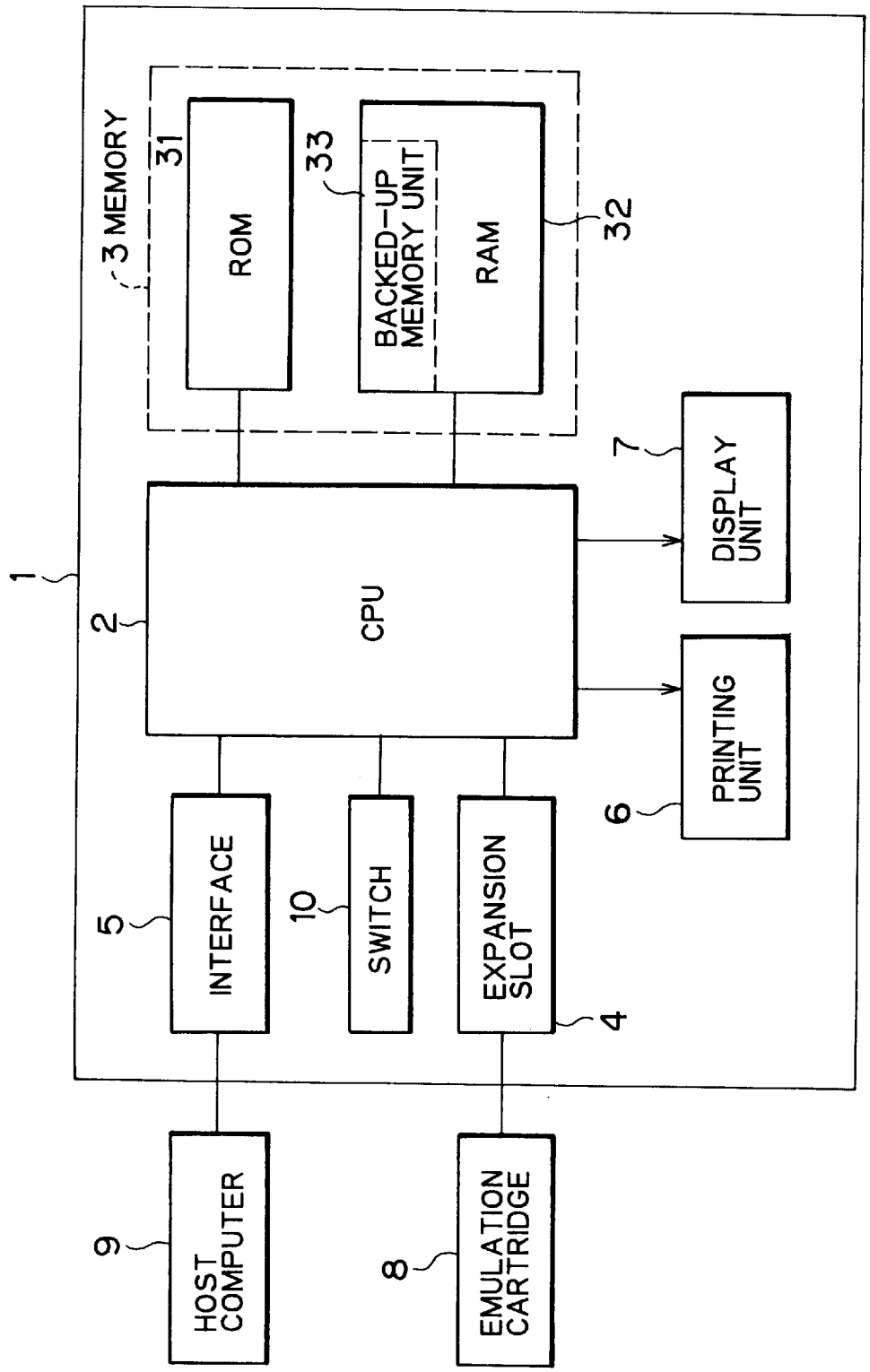
FIG. 1 is a block diagram showing a printer according to the present invention.

Referring to FIG. 1, the printer, denoted by reference numeral 1, includes a CPU (central processing unit) 2 for effecting arithmetic and control operations, a memory 3 for storing an emulation program, an expansion slot 4 for inserting an emulation cartridge 8 therein, an interface 5 for transferring data to and from a host computer 9, a printing unit 6, a display unit 7, and a mechanical switch 10 which is turned on when an emulation cartridge 8 is inserted into the expansion slot 4. The memory 3, the expansion slot 4, the interface 5, the printing unit 6, the display unit 7, and the switch 10 are connected to the CPU 2.

The memory 3 is made up of a ROM (read-only memory) 31 and a RAM (random access memory) 32, the latter having a backed-up memory unit 33 for storing the emulation program. The memory unit 33 may be electrically backed up by a battery or may be a non-volatile memory into which data can electrically be written. Therefore, the stored data in the memory unit 33 are not erased even if the printer is electrically disconnected from a power supply. The expansion slot 4 serves as an input means according to the present invention.

Figure 2:
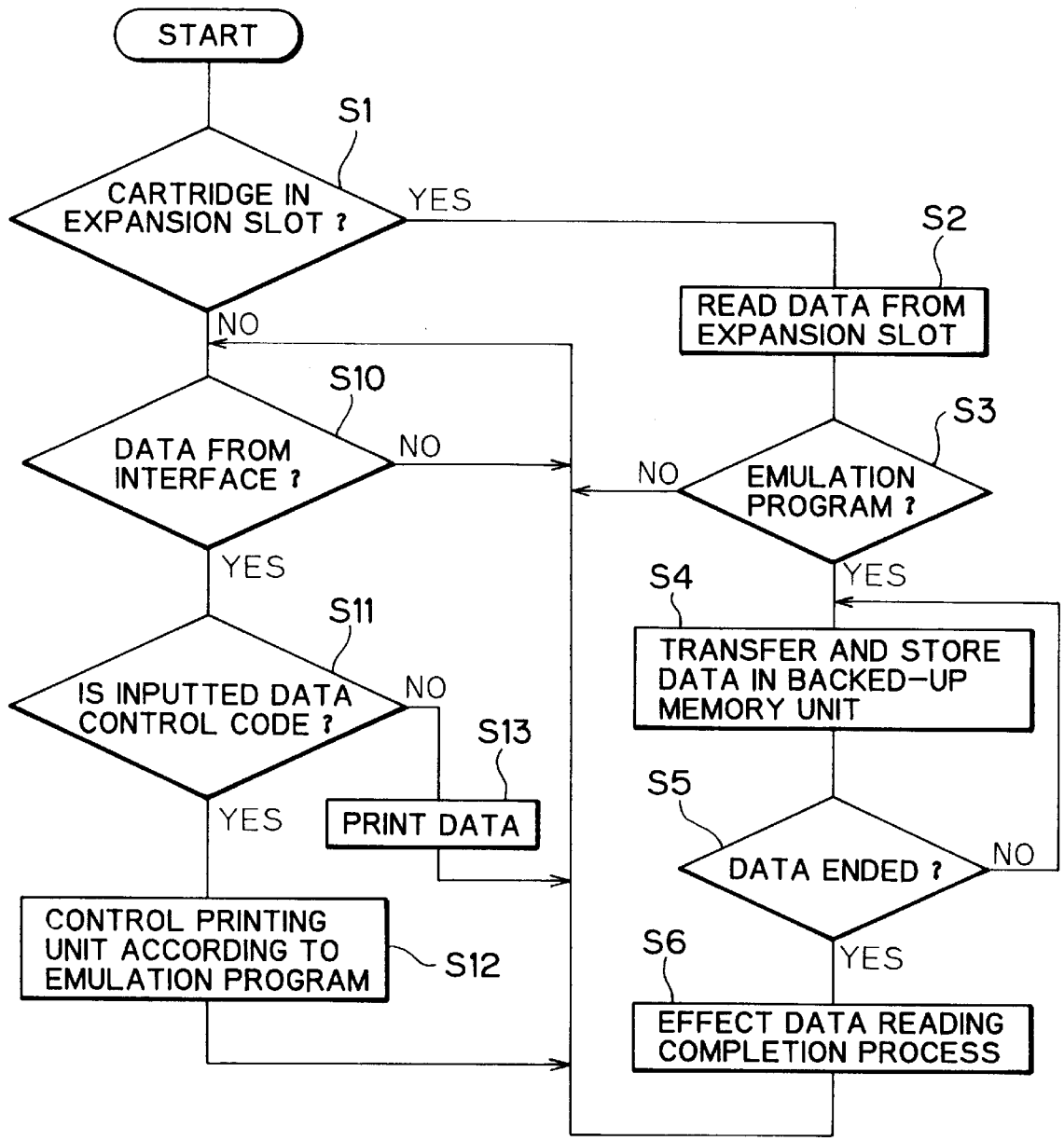
FIG. 2 is a flow chart illustrating an installation process of an emulation program according to a first embodiment of the present invention.

An operation sequence according to a first embodiment of the present invention will be described below with reference to the flow chart of FIG. 2.

First, a step S1 determines whether the cartridge 8 is inserted in the expansion slot 4 or not. The check can be performed on the basis of the state of the mechanical switch 10 which is turned on when the cartridge 8 is inserted into the expansion slot 4. The switch 10 is OFF when no cartridge is in the expansion slot 4. If the cartridge 8 is inserted into the expansion slot 4, then data are read from the cartridge 8 into the CPU 2 in a step S2. The CPU 2 determines whether the read data are of an emulation program or not in a step S3. The check may be implemented on the basis of an identification code added at the head of the data relayed from the cartridge 8. The identification code identifies that the following data are of the emulation program. The identification code further identifies the kind of the emulation program.

The read data may not be the emulation program data but may be font data if, for example, a font cartridge is inserted in the expansion slot 4. If so, i.e., if the read data are not the emulation program data, then the CPU 2 waits for data from the interface 5 in a step S10. If the identification code indicates that the read data are the emulation program data, then the CPU 2 transfers the data to and stores the data in the backed-up memory unit 33 in a step S4. If a previously stored emulation program exists in the memory unit 33, a newly introduced emulation program is overwritten, so that the previously stored emulation program is erased.

Therefore, there remains only a single optional emulation program in the backed-up memory unit 33.

Thereafter, the CPU 2 determines whether the data read from the cartridge 8 are ended or not in a step S5. If the data from the cartridge 8 still exist, i.e. "NO" in the step 5, then control returns to the step S4. If the data from the cartridge 8 no longer exist, i.e., "YES" in the step 5, then a data reading completion process is effected in a step S6, and then control goes to the step S10. The data reading completion process in the step S6 is for informing the user of the end of the data reading by so displaying on the display unit 7.

Upon completion of the installation of the emulation program, the user can remove the emulation cartridge 8 from the expansion slot 4. The expansion slot 4 is now available for the insertion of another cartridge such as a font cartridge, for example.

At the time control goes to the step S6, the optional emulation program stored in the backed-up memory unit 33 can be used instead of an emulation program which is originally stored in the ROM 31. Specifically, if data is inputted to the CPU 2 from the interface 5 in the step S10 and the inputted data is determined as a control code in a step S11, then the printing unit 6 is controlled according to the emulation program now stored in the backed-up memory unit 33 in a step 12. It should be noted that the control code is accompanied by an identification code representing the emulation program to be used. Based on the identification code, the CPU 2 determines which emulation program is to be selected upon comparing the received control code with the control code attached to each of the emulation programs. However, when the optional emulation program is not installed in the backed-up memory unit 33, then the emulation program stored in the ROM 31 is automatically used.

If the inputted data is not the control code in the step S11, then the inputted data are determined as print data and are subjected to printing in a step S13.

Figure 3:
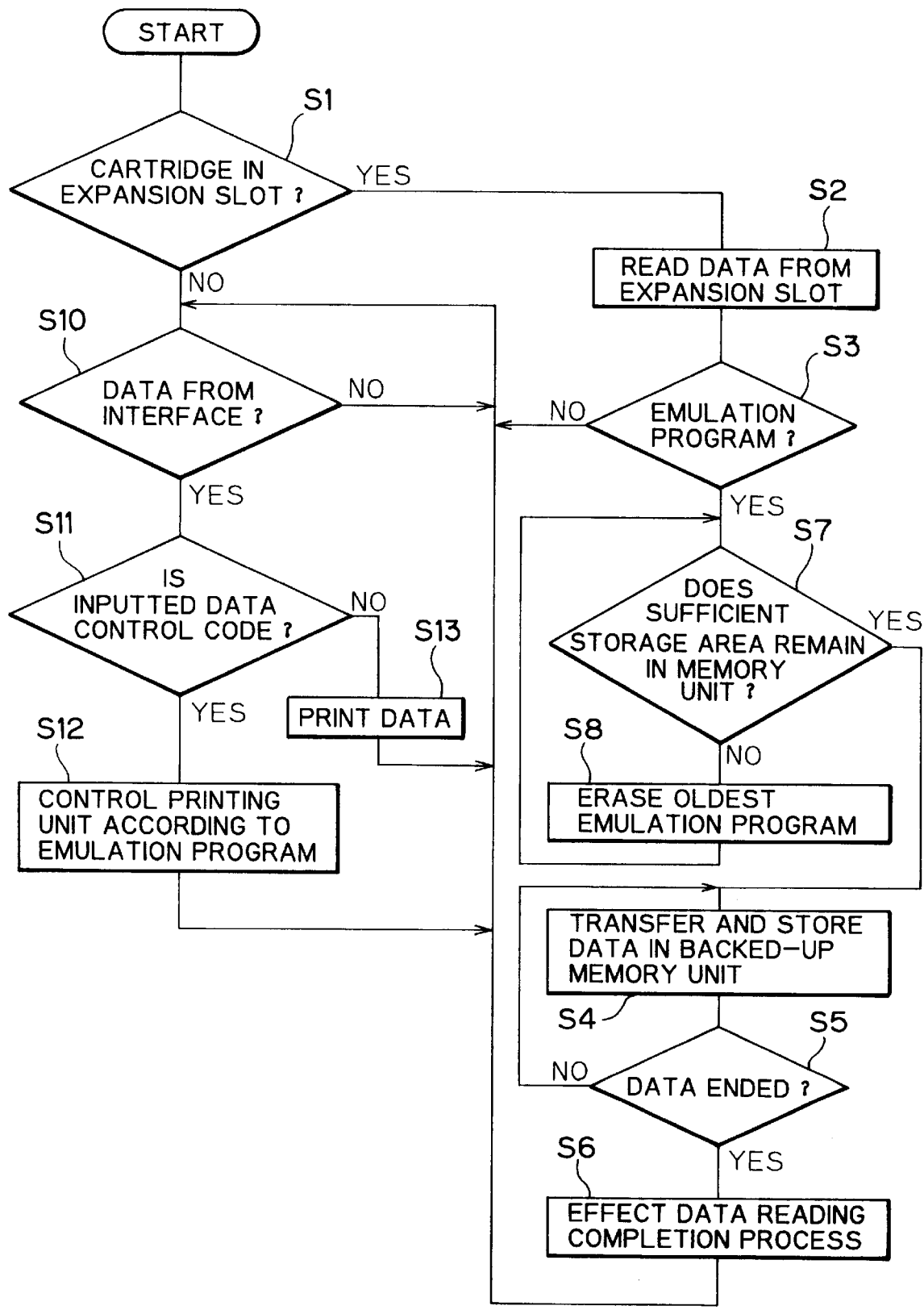
FIG. 3 is a flow chart illustrating an installation process of an emulation program according to a second embodiment of the present invention.

An operation sequence according to a second embodiment of the present invention will next be described with reference to the flow chart of FIG. 3. The same step numbers Si (i=1, 2, 3, . . .) in the flow charts of FIGS. 2 and 3 indicate the same or similar processing, therefore, duplicate description thereof is omitted. The flow chart of FIG. 3 is similar to that of FIG. 2 but is different in that steps S7 and S8 are newly introduced between the steps, S3 and S4 so that a plurality of optional emulation programs can co-exist in the backed-up memory unit 33. To enable a plurality of optional emulation programs to be stored in the back-up memory unit 33, the capacity thereof is largely reserved.

Referring to the flow chart of FIG. 3, the step S7 determines whether a sufficient storage area remains in the memory unit 33 after execution in step S3. If yes, the newly introduced emulation program is not overwritten in the memory unit 33 to cause the previously written emulation programs to be erased but is insertedly stored in the memory unit 33 without erasing the existing emulation programs. If, however, there does not remain a sufficient storage area in the memory unit 33, i.e., "NO" in the step S7, then the most previously written emulation program is erased in the step S8 to reserve a sufficient storage area allowing to store the new emulation program in the memory unit 33.

While exemplary embodiments of this invention have been described in detail, those skilled in the art will recognize that there are many possible modifications and variations which may be made in this exemplary embodiment while yet retaining many of the novel features and advantages of the invention. For example, although, in the above description, the expansion slot 4 serves as the input means for inputting the emulation program, the data of the emulation program may be inputted to the backed-up memory unit 33 from the host computer 9 through the interface 5. Further, while the insertion of the cartridge 8 in the expansion slot 4 is checked by the mechanical switch 10 in the illustrated embodiments, it may be checked by an electric signal generated upon insertion of the cartridge 8.

The control code and the print data relayed from the host computer 9 are typically composed of one byte but they may be composed of 2 or 3 bytes or more than this.

According to the present invention, it is advantageous in that an emulation program stored in a memory unit in the printer can easily be updated at all times. In addition, since the expansion slot 4 is not occupied by the emulation cartridge 8 unlike the conventional printers, the expansion slot 4 is available for other cartridges such as font cartridges.

What is claimed is:

1. A printer for receiving a control code and print data from a host computer and for controlling a printing unit according to the received control code to carry out printing based on the print data, comprising:

input means for inputting an emulation program used for interpreting the control code;

first storage means for storing the emulation program that has been inputted to said input means, said first storage means comprising back up memory means for backing up the first storage means so as not to erase the stored emulation program when the printer is powered off;

control means for controlling said input means, said first storage means and said back up memory means so that the emulation program inputted to said input means is installed in said first storage means; and second storage means for storing a preselected emulation program, wherein the emulation program stored in said first storage means and the preselected emulation program stored in said second storage means are selectively used in accordance with an identification code added to the control code received from the host computer.

2. The printer according to claim 1, wherein said control means installs the emulation program in said first storage means by overwriting the emulation program to cause a previously stored emulation program to be erased.

3. The printer according to claim 2, wherein each of the emulation program stored in said first storage means and the preselected emulation program in said second storage means contains an emulation program identification code which can be specified by the identification code of the control code.

4. The printer according to claim 1, wherein said control means installs the emulation program in said first storage means by insertedly writing the emulation program and preventing previously stored emulation programs from being erased.

5. The printer according to claim 4, wherein the emulation programs stored in said first storage means and the preselected emulation program stored in said second storage means are selectively used in accordance with an identification code added to the control code received from the host computer.

6. The printer according to claim 5, wherein each of the emulation programs stored in said first storage means and the preselected emulation program in said second storage means contains an emulation program identification code which can be specified by the identification code of the control code.

7. The printer according to claim 1, wherein said input means is an expansion slot for receiving an emulation cartridge containing the emulation program.

8. The printer according to claim 1, wherein said input means is an interface connected to an external device, said external device transmitting the emulation program to said interface.

9. A printer for receiving a control code and print data and for controlling a printing unit according to the received control code to carry out printing based on the print data, comprising:

input means for inputting data to said printer, said data including the print data and a loading emulation program;

first storage means for storing at least the loading emulation program that has been inputted to said input means, said first storage means including back up memory means for storing the loading emulation program and backing up the loading emulation program stored therein so as not to erase the stored loading emulation program when the printer is powered off;

control means for controlling said input means, said first storage means and said back up memory means, said control means comprising means for determining whether the data input to said input means is the loading emulation program, wherein if said determining means determines that the data input to said input means is the loading emulation program, the loading emulation program is automatically installed in said back up memory means; and second storage means for storing a preselected emulation program, wherein the loading emulation program stored in said back up memory means of said first storage means and the preselected emulation program stored in said second storage means are selectively used.

10. A printer for receiving a control code and print data and for controlling a printing unit according to the received control code to carry out printing based on the print data, comprising:

input means for inputting data to said printer, said data including the print data and a loading emulation program;

first storage means for storing at least the loading emulation program that has been inputted to said input means, a portion of said first storage means including back up memory means for storing the loading emulation program and backing up the loading emulation program stored therein so as not to erase the stored loading emulation program when the printer is powered off;

control means for controlling said input means, said first storage means and said back up memory means, said control means comprising means for determining whether the data input to said input means is the loading emulation program, wherein if said determining means determines that the data input to said input means is the loading emulation program, the loading emulation program is automatically installed in said back up memory means; and second storage means for storing a preselected emulation program, wherein the loading emulation program stored in said back up memory means of said first storage means and the preselected emulation program stored in said second storage means are selectively used.

* * * * *